(12) United States Patent
Woo et al.

(10) Patent No.: US 8,325,301 B2
(45) Date of Patent: Dec. 4, 2012

(54) LIQUID CRYSTAL DISPLAY DEVICE AND COLOR FILTER SUBSTRATE

(75) Inventors: Jong-Hoon Woo, Bucheon (KR); Young-Bok Lee, Bucheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/967,670

(22) Filed: Dec. 31, 2007

(65) Prior Publication Data

US 2009/0015763 A1    Jan. 15, 2009

(30) Foreign Application Priority Data

Jul. 13, 2007    (KR) .......................... 10-2007-0070870

(51) Int. Cl.
*G02F 1/1333* (2006.01)
(52) U.S. Cl. ...................................................... 349/110
(58) Field of Classification Search ........... 349/106–110
See application file for complete search history.

(56) References Cited

U.S. PATENT DOCUMENTS 5,128,786 A * 7/1992 Yanagisawa .................. 349/111
5,754,263 A * 5/1998 Akiyama et al. .............. 349/110
2001/0040717 A1* 11/2001 Minoura et al. ............... 359/263
2005/0225708 A1* 10/2005 Oke et al. ...................... 349/139

FOREIGN PATENT DOCUMENTS

TW                463067 B    11/2001

OTHER PUBLICATIONS

Office Action issued in corresponding Taiwanese Patent Application No. 096150397, mailed Nov. 23, 2011.

* cited by examiner

*Primary Examiner* — Mark Robinson
*Assistant Examiner* — Michael Inadomi
(74) *Attorney, Agent, or Firm* — Brinks Hofer Gilson & Lione

(57) ABSTRACT

A liquid crystal display (LCD) device comprises a substrate, and red, green, blue (RGB) color filters. The RGB color filters are spaced from one another with a predetermined gap therebetween on the substrate, and define RGB sub-pixels. The LCD device further comprises black matrixes disposed at each space between the RGB color filters, and barriers disposed at each interface among the RGB sub-pixels such that the barriers control a path of light that passes through a corresponding sub-pixel.

7 Claims, 6 Drawing Sheets

LIQUID CRYSTAL DISPLAY DEVICE AND COLOR FILTER SUBSTRATE

CLAIM FOR PRIORITY

The present application claims priority to Korean Patent Application No. 10-2007-0070870, filed on Jul. 13, 2007, the entirety of which is herein incorporated by reference.

FIELD

The present application relates to a liquid crystal display (LCD) device for selectively driving a narrow viewing angle mode and a wide viewing angle mode, and more particularly, to an LCD device capable of enhancing a brightness of a display screen and facilitating a fabrication process by providing barriers in a substrate so that a part or all of one surface of the barriers can come in contact with black matrixes, and a method for fabricating the same.

BACKGROUND

Generally, an LCD device is being widely used due to its characteristics such as a light weight, a thin thickness, and a low power consumption. Recently, application fields of the LCD device are expanded to a portable computer such as a notebook PC, office automation equipment, and audio/video apparatus.

In the LCD device, a desired image is displayed on a screen by controlling an optical transmittance according to image signals applied to a plurality of switching controllers arranged in a matrix form.

The LCD device comprises an LC panel including a color filter substrate which is an upper substrate, a thin film transistor (TFT) array substrate which is a lower substrate, and an LC layer disposed between the two facing substrates; and an LC panel driving portion for driving the LC panel by supplying scan signals and image signals to the LC panel.

According to arrangement forms of liquid crystals and electrodes for applying an electric field to the liquid crystals, the LCD device is classified into an ECB (Electrically Controlled Birefringence) mode LCD device, a VA (Vertical Alignment) mode LCD device, a TN (Twisted Nematic) mode LCD device, and an IPS (In Plane Switching) mode LCD device.

Among the various types, the ECB mode and the TN mode LCD devices have a disadvantage that a viewing angle is narrow. On the contrary, the VA mode and the IPS mode LCD devices have an advantage that a viewing angle is wide. Accordingly, the VA mode and IPS mode LCD devices for a wide viewing angle are being widely practised.

However, the VA mode and the IPS mode LCD devices may cause the following problems. For example, when the VA mode and the IPS mode LCD devices are used for a user's personal purpose, the user's privacy may be damaged by his neighbors. Furthermore, when the VA mode and the IPS mode LCD devices are used for a confidential business, the confidential contents may be leaked out.

So as to solve the problems related to security, an LCD device for selectively implementing a display mode between a narrow viewing angle mode and a wide viewing angle mode has been proposed.

Hereinafter, the LCD device for selectively implementing a display mode between a narrow viewing angle mode and a wide viewing angle mode will be explained in more detail.

As shown in FIG. 1A, the LCD device for selectively implementing a display mode between a narrow viewing angle mode and a wide viewing angle mode is provided with an LC panel constituted with first, second, and third substrates 8, 11 and 9.

Referring to FIGS. 1A and 1B, the first substrate 8 serves as a color filter substrate. RGB color filters 3 that define RGB sub-pixels 2, and black matrixes 4 are formed on a transparent substrate 1. Here, one group composed of each one line of the RGB sub-pixels 2 defines one sub-pixel line 7. That is, the RGB sub-pixel line 7 corresponds to one vertical line of the RGB sub-pixels 2.

The second substrate 11 serves as a barrier substrate having barriers 5 for controlling a viewing angle. The second substrate 11 is attached to one surface of the first substrate 8 where the black matrixes 4 and the color filter 3 are not formed. The barriers 5 formed at the second substrate 11 are alternately formed above one RGB sub-pixel line 7 among a plurality of the RGB sub-pixel lines 7. More concretely, the barriers 5 are formed above one RGB sub-pixel line 7, but are not formed above an adjacent RGB sub-pixel line 7. Again, the barriers 5 are formed next to the adjacent RGB sub-pixel line 7. The pattern is repeatedly formed. Here, the barriers 5 entirely overlap an entire upper portion of the corresponding sub-pixel line 7, and partially extend to upper portions of adjacent sub-pixel lines 7 in right and left directions.

Although not shown, the third substrate 9 serving as a thin film transistor (TFT) array substrate includes gate and data lines that define RGB sub-pixels 2 by crossing each other on the transparent substrate, TFTs formed at each sub-pixel 2, and pixel electrodes.

As shown in FIG. 2A, when the conventional LCD device is to be operated in a narrow viewing angle mode, the RGB sub-pixels 2 having the barriers 5 thereabove are not operated, but the RGB sub-pixels 2 not having the barriers 5 thereabove are operated. On the contrary, as shown in FIG. 2, when the conventional LCD device is to be operated in a wide viewing angle mode, all the RGB sub-pixels 2 are operated.

However, in the conventional LCD device, most of the upper portions of the RGB sub-pixel 2 are shielded by the barriers 5, thereby decreasing an aperture ratio and thus lowering a brightness of a display screen.

Also, in the conventional LCD device for selectively implementing a display mode between a narrow viewing angle mode and a wide viewing angle mode, the second substrate 11 serving as a barrier substrate is provided thus to increase manufacturing costs.

Furthermore, in order to space the color filter 3 formed at the first substrate 8 and the barriers 5 formed at the second substrate 11 from each other, required are a process for etching one surface of the first substrate 8 where the black matrixes 4 and the color filter 3 are not formed, and a process for attaching the first substrate 8 and the second substrate 11 to each other.

SUMMARY

In one embodiment, a liquid crystal display (LCD) device comprises a substrate, and red, green, blue (RGB) color filters. The RGB color filters are spaced from one another with a predetermined gap therebetween on the substrate, and define RGB sub-pixels. The LCD device further comprises black matrixes disposed at each space between the RGB color filters, and barriers disposed at each interface among the RGB sub-pixels such that the barriers control a path of light that passes through a corresponding sub-pixel.

In another embodiment, a method for fabricating an LCD device comprises preparing a substrate, and forming a plurality of grooves on regions of an upper surface of the substrate where black matrixes are to be formed, towards inside of the substrate. The method further comprises forming barriers by filling black resins in the grooves, forming black matrixes on the substrate where the barriers are formed, and forming RGB color filters on the substrate where the black matrixes are formed, thereby defining RGB sub-pixels.

In yet another embodiment, a color filter substrate comprises red, green, blue (RGB) color filters that are spaced from one another with a predetermined gap therebetween, and define RGB sub-pixels. The color filter substrate further comprises black matrixes disposed at each space between the RGB color filters, and barriers disposed at each interface among the RGB sub-pixels such that the barriers control a path of light that passes through a corresponding sub-pixel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1A:
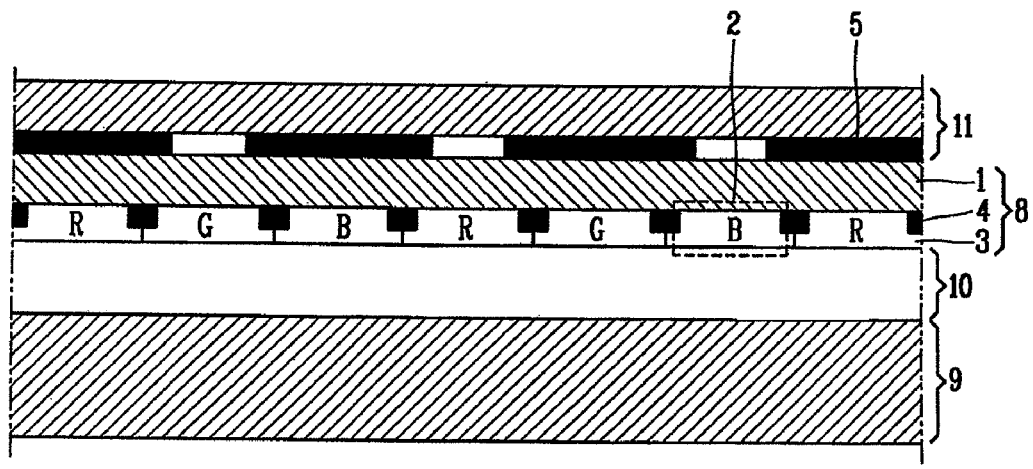
FIG. 1A is a sectional view of a liquid crystal display (LCD) device in accordance with the conventional art.
Figure 1B:
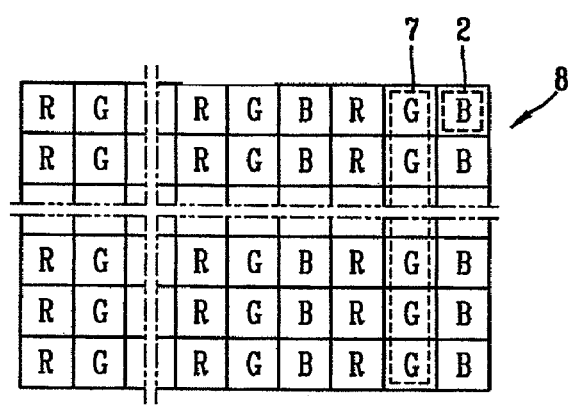
FIG. 1B is a plane view of the liquid crystal display (LCD) device in accordance with the conventional art.
Figure 2A:
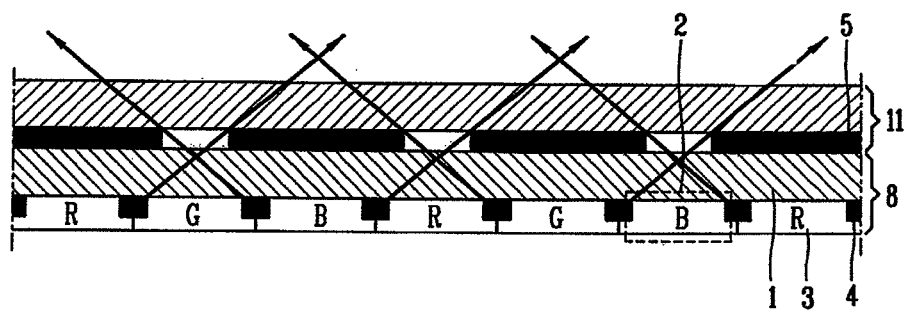
FIG. 2A is a sectional view of the LCD device of FIGS. 1A and 1B which is driven in a narrow viewing angle mode.
Figure 2B:
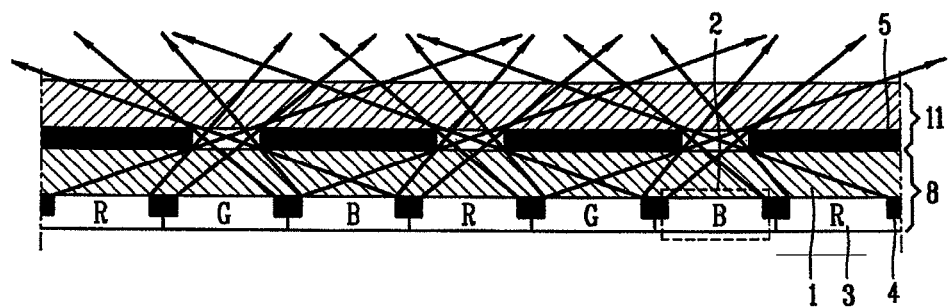
FIG. 2B is a sectional view of the LCD device of FIGS. 1A and 1B which is driven in a wide viewing angle mode.

Reference will now be made in detail to the preferred embodiments of the present disclosure, examples of which are illustrated in the accompanying drawings.

Hereinafter, a liquid crystal display (LCD) device and a method for fabricating the same according to the preferred embodiments of the present disclosure will be explained in more detail with reference to the attached drawings.

A liquid crystal display (LCD) device according to a first embodiment of the present disclosure will be explained with reference to FIGS. 3A and 3B.

As shown, the liquid crystal display (LCD) device according to a first embodiment of the present disclosure comprises a substrate 101; RGB color filters 103 spaced from one another with a predetermined gap therebetween on the substrate 101, and defining RGB sub-pixels 102; black matrixes 104 formed at each space between the RGB color filters 103; and barriers 105 formed at each interface among the RGB sub-pixels 102, for controlling a path of light that passes through a corresponding sub-pixel 102. The barriers 105 are formed in the substrate with a bar shape so that one surface thereof can come in contact with the black matrixes 104. A width of the barriers 105 is the same as or similar to a width of the black matrixes 104 in right and left directions. The RBG sub-pixels 102 constitute one unit pixel 106, and one line of the unit pixels 106 constitutes one unit pixel line 107. The barriers 105 are formed at each interface between the unit pixel lines 107. The barriers 105 are formed at each interface between one unit pixel line 107 and two unit pixel lines 107.

Figure 3A:
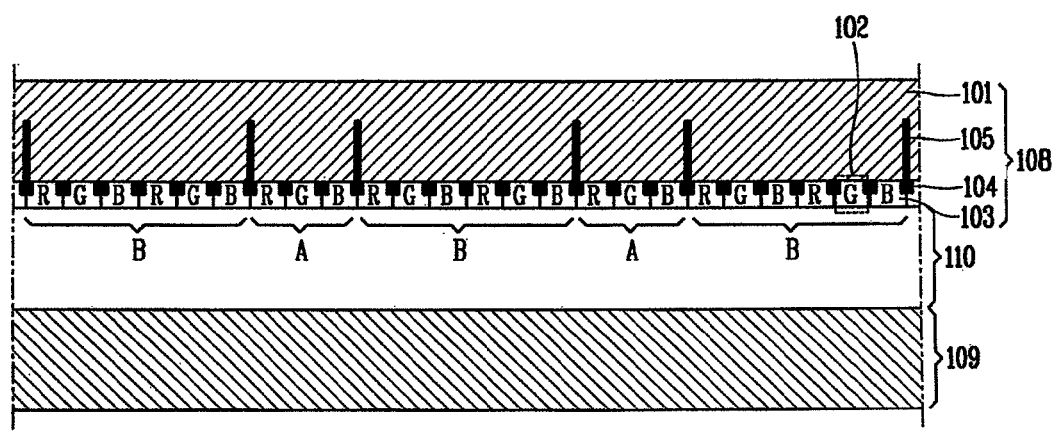
FIG. 3A is a sectional view of a liquid crystal display (LCD) device according to a first embodiment.

As shown in FIG. 3A, the LCD device according to a first embodiment of the present disclosure comprises a color filter substrate 108, an upper substrate; a thin film transistor (TFT) array substrate 109, a lower substrate; and an LC layer 110 disposed between the two substrates.

The color filter substrate 108 includes a transparent substrate 101, a color filter 103, black matrixes 104, barriers 105, and common electrodes (not shown) each formed on the transparent substrate 101.

Although not shown, the TFT array substrate 109 includes gate and data lines that define RGB sub-pixels 102 by crossing each other on the transparent substrate, TFTs formed at each sub-pixel 102, and pixel electrodes.

As shown in FIG. 3A, the color filter substrate 108 defines RGB sub-pixels 102 as RGB color filters 103 are spaced from each other on the transparent substrate 101.

The color filter 103 passes light of a specific wavelength, thereby implementing a color display.

The RGB sub-pixels 102 constitute one unit pixel 106, and one line of the unit pixels 106 defines one unit pixel line 107. That is, the unit pixel line 107 corresponds to one vertical line of the unit pixels 106.

In the drawings, RGB color filters 103 are formed on the transparent substrate 101. However, the color filters 103 are not limited to the three colors. Rather, red, green, blue, and white (RGBW) color filters 103 may be implemented. Here, the white color filter is a sub-pixel having no color filter.

In the drawings, RGB sub-pixels 102 of the unit pixel 106 are arranged in a horizontal direction. However, RGB sub-pixels 102 of the unit pixel 106 may be arranged in a horizontal direction, etc.

The black matrixes 104 are formed at each interface among the RGB color filters 103.

The black matrixes 104 prevent an optical interference among the RGB sub-pixels 102 formed at the RGB color filters 103, thereby preventing a contrast from lowering. The black matrixes 104 are formed to overlap the gate lines, the data lines, and the TFTs on the TFT array substrate 109, that is, is formed at each region rather than the pixel electrodes.

As shown in FIG. 3A, the color filter substrate 108 is provided with the barriers 105 formed in the transparent substrate 101 with a bar shape so that one surface thereof can partially or entirely come in contact with the black matrixes 104.

The barriers 105 are formed at each interface between the unit pixel lines 107 with a long bar shape, which will be explained in more detail.

As shown in FIG. 3A, the barriers 105 of the LCD device according to a first embodiment of the present disclosure are formed at each interface between one unit pixel line 107 and two unit pixel lines 107. That is, the barriers 105 are formed at each interface between a group (A) of one unit pixel line 107 and a group (B) of two unit pixel lines 107. Each one surface of the barriers 105 entirely or partially comes in contact with the black matrixes 104. Here, the barriers 105 of the LCD device may not come in contact with the black matrixes 104, but may overlap the black matrixes 104.

The barriers 105 may overlap the black matrixes 104 with a width similar to or same as a right-left width of the black matrixes 104. Since the barriers 105 overlap an upper part of the black matrixes 104 without overlapping an upper part of the RGB sub-pixels 102, a user of the LCD device can not recognize the barriers 105.

Each length of the barriers 105 in upper and lower directions, that is, each length from contact points with the black matrixes 104 to upper surfaces of the barriers 105, is properly designed according to a degree of a narrow viewing angle to be implemented. More concretely, when a narrower viewing angle in a narrow viewing angle mode is to be implemented, each length of the barriers 105 in upper and lower directions is designed to be long. On the contrary, when a wider viewing angle in a narrow viewing angle mode is to be implemented, each length of the barriers 105 in upper and lower directions is designed to be short.

In the LCD device according to a first embodiment of the present disclosure, a narrow viewing angle mode and a wide viewing angle mode are selectively implemented, which will be explained in more detail with reference to FIGS. 4A and 4B.

In a narrow viewing angle mode, only the RGB sub-pixels 102 of the group (A) having barriers 105 at both interfaces between adjacent unit pixel lines 107 are driven, but the RGB sub-pixels 102 of the group (B) of the other unit pixel lines 107 are neither driven nor receive black data.

Figure 4A:
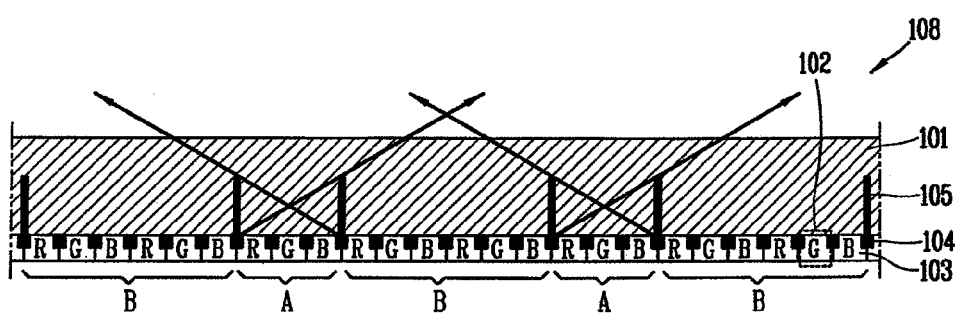
FIG. 4A is a sectional view of the LCD device of FIGS. 3A and 3B which is driven in a narrow viewing angle mode.

As shown in FIG. 4A, light incident to the RGB sub-pixels 102 of the unit pixel lines 107 having the barriers 105 at each interface between adjacent unit pixel lines 107, with a relatively larger incidence angle, is shielded by the barriers 105. However, light incident thereto with a relatively smaller incidence angle passes through inside of the transparent substrate 101 without being shielded by the barriers 105, and then is emitted outside the transparent substrate 101. Accordingly, an optical path is controlled by the barriers 105, and thus a screen of a narrow viewing angle can be implemented.

When a wide viewing angle mode is to be implemented, all the RGB sub-pixel lines 107 are driven.

Figure 4B:
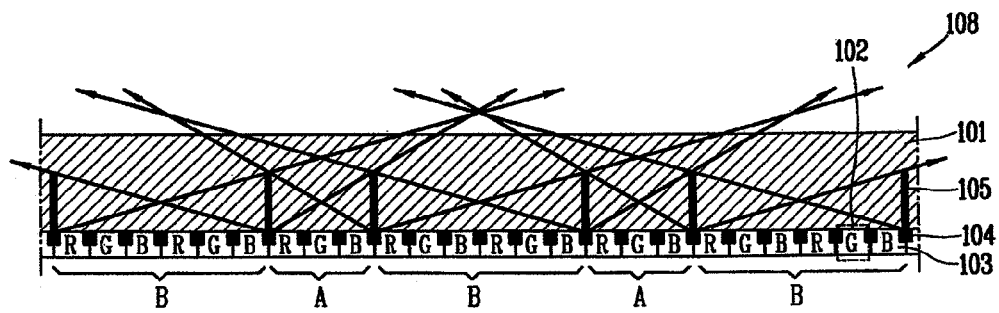
FIG. 4B is a sectional view of the LCD device of FIGS. 3A and 3B which is driven in a wide viewing angle mode.

As shown in FIG. 4B, most of the light incident to the RGB sub-pixels 102 passes through inside of the transparent substrate 101 without being shielded by the barriers 105, and then is emitted outside the transparent substrate 101. Accordingly, a screen of a wide viewing angle can be implemented.

Although not shown, the light incident to the RGB sub-pixels 102 is light emitted from a backlight assembly provided below the color filter substrate 108 and the TFT array substrate 109.

Hereinafter, a method for fabricating an LCD device according to a first embodiment of the present disclosure will be explained in more detail with reference to FIGS. 5A to 5D and FIGS. 3A and 3B.

First, the transparent substrate 101 is prepared.

Figure 5A:
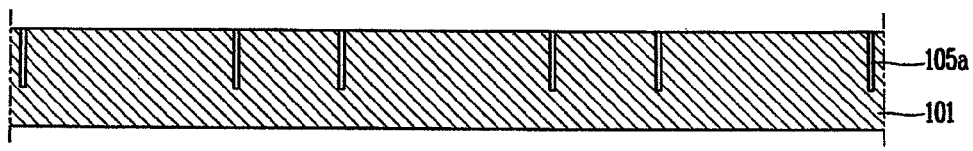
FIGS. 5A to 5D are sectional views illustrating a method for fabricating the LCD device of FIGS. 3A and 3B.

As shown in FIG. 5A, a plurality of grooves 105a are formed on an upper surface of the transparent substrate 101 where the black matrixes 104 are to be formed, towards inside of the transparent substrate 101. Here, the grooves 105a are formed to overlap the black matrixes 104 to be formed on the transparent substrate 101, with a width similar to or same as each width of the black matrixes in right and left directions. A length of the groove 105a in upper and lower directions, that is, a length from a surface of the transparent substrate 101 where the black matrixes 104 are to be formed to a lower end of the groove 105a, is properly designed according to a degree of a narrow viewing angle to be implemented. The grooves 105a are formed at each interface between one unit pixel line 107 and another unit pixel line 107. Here, the unit pixel line 107 corresponds to one vertical line of the unit pixels 106, and one unit pixel 106 is composed of three RGB sub-pixels 102.

Figure 5B:
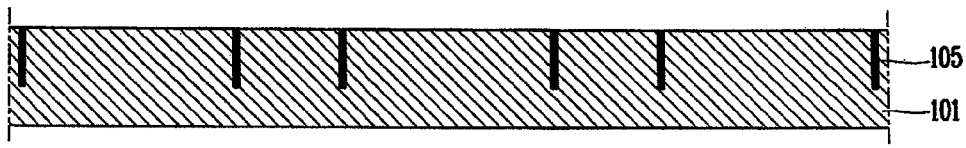

As shown in FIG. 5B, a black resin is filled in the grooves 105a formed on the transparent substrate 101, thereby forming the barriers 105

Figure 5C:
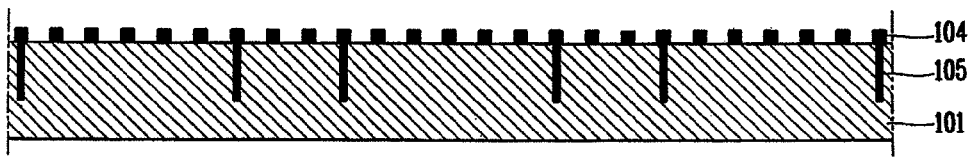

As shown in FIG. 5C, the black matrixes 104 are formed on the transparent substrate 101 where the barriers 105 are formed. Here, the black matrixes 104 are formed to overlap the barriers 105 with a width similar to or same as a right-left width of the barriers 105.

Figure 5D:
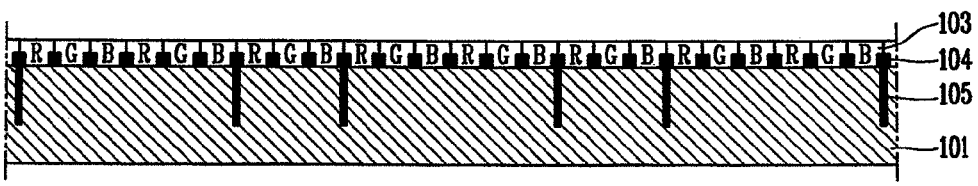

As shown in FIG. 5D, RGB color filters 103 are formed on the transparent substrate 101 where the black matrixes 104 are formed, thereby defining RGB sub-pixels 102. Here, the RBG sub-pixels 102 constitute one unit pixel 106, and one line of the unit pixels 106 constitutes one unit pixel line 107.

A liquid crystal display (LCD) device according to a second embodiment of the present disclosure will be explained with reference to FIGS. 6A and 6B.

Explanation for same components of the LCD device according to the second embodiment as those of the LCD device according to the first embodiment will be omitted. And, components of the LCD device according to the second embodiment not shown in FIGS. 6A and 6B will be explained with reference to the LCD device according to the first embodiment.

As shown, the liquid crystal display (LCD) device according to the second embodiment of the present disclosure comprises a substrate 201; RGB color filters 203 spaced from one another with a predetermined gap therebetween on the substrate 201, and defining RGB sub-pixels 202; black matrixes 204 formed at each space between the RGB color filters 203; and barriers 205 formed at each interface among the RGB sub-pixels 202, for controlling a path of light that passes through a corresponding sub-pixel 202. The barriers 205 are formed in the substrate 201 with a bar shape so that one surface thereof can come in contact with the black matrixes 204. A width of the barriers 205 is the same as or similar to a width of the black matrixes 204. The RBG sub-pixels 202 constitute one unit pixel (refer to 106 of FIG. 3B), and one line of the unit pixels constitutes one unit pixel line (refer to 107 of FIG. 3B). The barriers 205 are formed at each interface among one unit pixel line, one unit pixel line, and two unit pixel lines.

Referring to FIG. 3A of the first embodiment of the present disclosure, the LCD device according to the second embodiment of the present disclosure comprises a color filter substrate 208 which is an upper substrate, and a thin film transistor (TFT) array substrate (refer to 109 of FIG. 3A) which is a lower substrate.

The color filter substrate 208 includes the transparent substrate 201, the color filter 203, the black matrixes 204, the barriers 205, and common electrodes (not shown) each formed on the transparent substrate 201. Although not shown, the TFT array substrate includes gate and data lines that define RGB sub-pixels 202 by crossing each other on the transparent substrate 201, TFTs formed at each sub-pixel 202, and pixel electrodes.

Figure 6A:
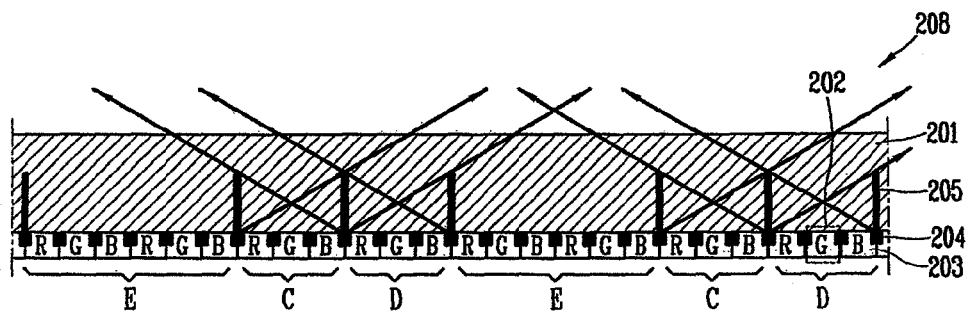
FIG. 6A is a sectional view of a liquid crystal display (LCD) device according to a second embodiment which is driven in a narrow viewing angle mode.
Figure 6B:
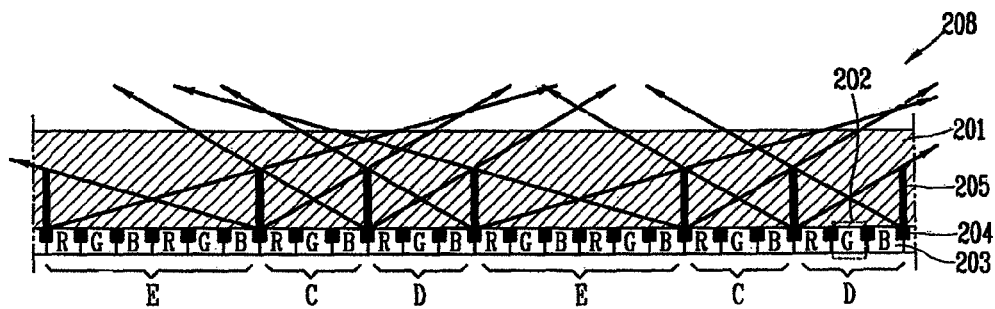
FIG. 6B is a plane view of the liquid crystal display (LCD) device according to a second embodiment which is driven in a wide viewing angle mode.

As shown in FIGS. 6A and 6B, RGB color filters 203 of the color filter substrate 208 are spaced from one another with a predetermined gap therebetween on the transparent substrate 201, thereby defining RGB sub-pixels 202.

Figure 3B:
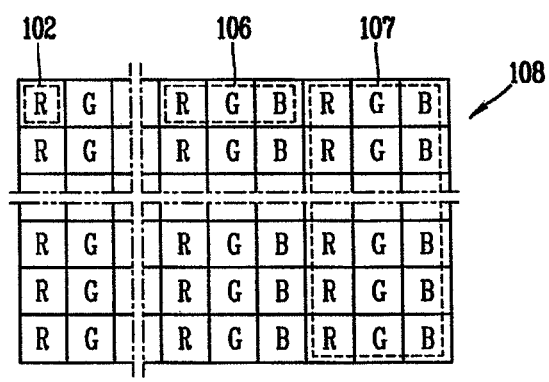
FIG. 3B is a plane view of the liquid crystal display (LCD) device according to a first embodiment.

The RGB sub-pixels 202 constitute one unit pixel (refer to 106 of FIG. 3B), and one line of the unit pixels defines one unit pixel line (refer to 107 of FIG. 3B). That is, the unit pixel line corresponds to one vertical line of the unit pixels.

The black matrixes 204 are formed at each space between the RGB color filters 203.

As shown in FIGS. 6A and 6B, the barriers 205 are formed in the transparent substrate 201 with a bar shape so that one surface thereof can partially or entirely come in contact with the black matrixes 204.

The barriers 205 are formed at each interface between the unit pixel lines with a long bar shape, which will be explained in more detail.

As shown in FIGS. 6A and 6B, the barriers 205 of the LCD device according to a second embodiment of the present disclosure are formed at each interface among one unit pixel line, one unit pixel line, and two unit pixel lines. That is, the barriers 205 are formed at each interface among a group (C) of one unit pixel line, a group (D) of one unit pixel line, and a group (E) of two unit pixel lines. Each one surface of the barriers 205 entirely or partially comes in contact with the black matrixes 204. Here, the barriers 205 of the LCD device may not come in contact with the black matrixes 204, but may overlap the black matrixes 204.

The barriers 205 may overlap the black matrixes 204 with a width similar to or same as a right and left width of the black matrixes 204. Since the barriers 205 overlaps an upper part of the black matrixes 204 without overlapping an upper part of the RGB sub-pixels 202, a user of the LCD device can not recognize the barriers 205.

Each length of the barriers 205 in upper and lower directions, that is, each length from contact points with the black matrixes 204 to upper surfaces of the barriers 205, is properly designed according to a degree of a narrow viewing angle to be implemented. More concretely, when a narrower viewing angle in a narrow viewing angle mode is to be implemented, each length of the barriers 205 in upper and lower directions is designed to be long. On the contrary, when a wider viewing angle in a narrow viewing angle mode is to be implemented, each length of the barriers 205 in upper and lower directions is designed to be short.

In the LCD device according to a second embodiment of the present disclosure, a narrow viewing angle mode and a wide viewing angle mode are selectively implemented, which will be explained in more detail with reference to FIGS. 6A and 6B.

In a narrow viewing angle mode, only the RGB sub-pixels 202 of the unit pixel line having barriers 105 at both interfaces between adjacent unit pixel lines are driven, but the RGB sub-pixels 202 of the other unit pixel lines are neither driven nor receive black data.

That is, in a narrow viewing angle mode, only the RGB sub-pixels 202 of a first group (C) having one unit pixel line, and a second group (D) having another unit pixel line are driven, but a third group (E) having two unit pixel lines are neither driven nor receive black data. Here, the C, D, and E are respectively provided with the barriers 205 at each interface between adjacent unit pixel lines.

As shown in FIGS. 6A and 6B, light incident to the RGB sub-pixels 202 of the unit pixel lines having the barriers 205 at each interface between adjacent unit pixel lines, with a relatively larger incidence angle, is shielded by the barriers 205. However, light incident thereto with a relatively smaller incidence angle passes through inside of the transparent substrate 201 without being shielded by the barriers 205, and then is emitted outside the transparent substrate 201. Accordingly, an optical path is controlled by the barriers 205, and thus a screen of a narrow viewing angle can be implemented.

In the narrow viewing angle mode, only a half of the RGB sub-pixels of the color filter substrate 208 are driven, thereby having a higher aperture ratio than that of the first embodiment.

When a wide viewing angle mode is to be implemented, all the RGB sub-pixel lines are driven.

As shown in FIGS. 6A and 6B, most of the light incident to the RGB sub-pixels 202 passes through inside of the transparent substrate 201 without being shielded by the barriers 205, and then is emitted outside the transparent substrate 201. Accordingly, a screen of a wide viewing angle can be implemented.

Although not shown, the light incident to the RGB sub-pixels 202 is light emitted from a backlight assembly provided below the color filter substrate 208 and the TFT array substrate.

A method for fabricating an LCD device according to a second embodiment of the present disclosure is the same as the method according to the first embodiment except for the position of the barriers 205. Therefore, explanation for the method for fabricating an LCD device according to a second embodiment of the present disclosure will be omitted.

That is, the method for fabricating an LCD device according to the second embodiment of the present disclosure is the same as the method according to the first embodiment, except that the barriers 205 are formed at each interface between one unit pixel line and one unit pixel line, or between one unit pixel line and two unit pixel lines.

A liquid crystal display (LCD) device according to a third embodiment of the present disclosure will be explained with reference to FIGS. 7A and 7B.

Explanation for same components of the LCD device according to the third embodiment as those of the LCD devices according to the first and second embodiments will be omitted. And, components of the LCD device according to the third embodiment not shown in FIGS. 7A and 7B will be explained with reference to the LCD device according to the first embodiment.

Figure 7A:
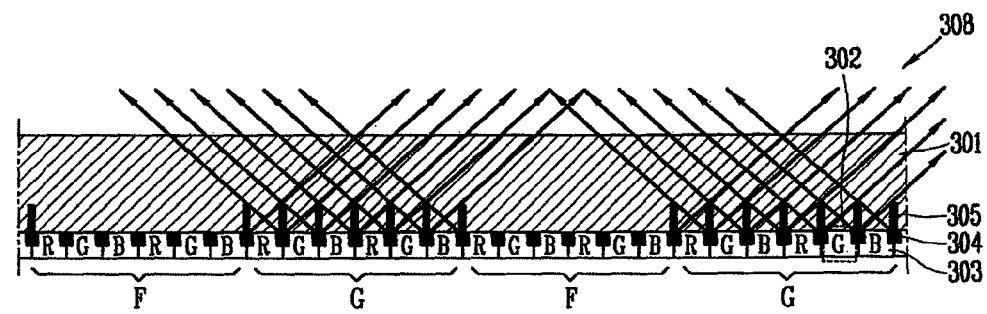
FIG. 7A is a sectional view of a liquid crystal display (LCD) device according to a third embodiment which is driven in a narrow viewing angle mode.
Figure 7B:
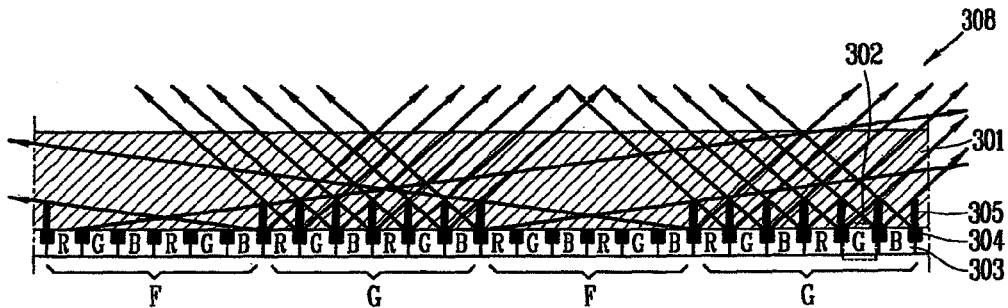
FIG. 7B is a plane view of the liquid crystal display (LCD) device according to a third embodiment which is driven in a wide viewing angle mode.

As shown in FIGS. 7A and 7B, the liquid crystal display (LCD) device according to the third embodiment of the present disclosure comprises: a substrate 301; RGB color filters 303 spaced from one another with a predetermined gap therebetween on the substrate 301, and defining RGB sub-pixels 302; black matrixes 304 formed at each space between the RGB color filters 303; and barriers 305 formed at each interface among the RGB sub-pixels 302, for controlling a path of light that passes through a corresponding sub-pixel 302. The barriers 305 are formed in the substrate 301 with a bar shape so that one surface thereof can come in contact with the black matrixes 304. Each width of the barriers 305 in right and left directions is the same as or similar to each width of the black matrixes 304 in right and left directions. The RBG sub-pixels 302 constitute one unit pixel (refer to 106 of FIG. 3B), and one line of the unit pixels constitutes one unit pixel line (refer to 107 of FIG. 3B). The barriers 305 are further formed at each interface among the RGB sub-pixels 302 in an alternate manner between two unit pixel lines and two unit pixel lines.

Referring to FIG. 3A of the first embodiment of the present disclosure, the LCD device according to the third embodiment of the present disclosure comprises a color filter substrate 308 which is an upper substrate, and a thin film transistor (TFT) array substrate (refer to 109 of FIG. 3A) which is a lower substrate.

The color filter substrate 308 includes the transparent substrate 301, the color filter 303, the black matrixes 304, the barriers 305, and common electrodes (not shown) each formed on the transparent substrate 301.

Although not shown, the TFT array substrate includes gate and data lines that define RGB sub-pixels 302 by crossing each other on the transparent substrate 301, TFTs formed at each sub-pixel 302, and pixel electrodes.

As shown in FIGS. 7A and 7B, RGB color filters 303 of the color filter substrate 308 are spaced from one another with a predetermined gap therebetween on the transparent substrate 301, thereby defining RGB sub-pixels 302.

The RGB sub-pixels 302 constitute one unit pixel, and one line of the unit pixels defines one unit pixel line. That is, the unit pixel line corresponds to one vertical line of the unit pixels.

The black matrixes 304 are formed at each space between the RGB color filters 303.

As shown in FIGS. 7A and 7B, the barriers 305 are formed in the transparent substrate 301 with a bar shape so as to come in contact with the black matrixes 304.

The barriers 305 are formed at each interface between the unit pixel lines with a long bar shape, which will be explained in more detail.

As shown in FIGS. 7A and 7B, the barriers 305 of the LCD device according to a third embodiment of the present disclosure are formed at each interface between two unit pixel lines and two unit pixel lines. The barriers 305 are further formed at each interface among the RGB sub-pixels 302 in an alternate manner between the two unit pixel lines and the two unit pixel lines.

That is, the barriers 305 are formed at each interface between a group having two unit pixel lines and a group having another two unit pixel lines, and are further formed at each interface among the RGB sub-pixels 302 in an alternate manner between the two groups. Each one surface of the barriers 305 entirely or partially comes in contact with the black matrixes 304. Here, the barriers 305 of the LCD device may not come in contact with the black matrixes 304, but may overlap the black matrixes 304.

The barriers 305 may overlap the black matrixes 304 with a width similar to or same as a right-left width of the black matrixes 304. Since the barriers 305 overlap an upper part of the black matrixes 304 without overlapping an upper part of the RGB sub-pixels 302, a user of the LCD device can not recognize the barriers 305.

Each length of the barriers 305 in upper and lower directions, that is, each length from contact points with the black matrixes 304 to upper surfaces of the barriers 305, is properly designed according to a degree of a narrow viewing angle to be implemented. More concretely, when a narrower viewing angle in a narrow viewing angle mode is to be implemented, each length of the barriers 305 in upper and lower directions is designed to be long. On the contrary, when a wider viewing angle in a narrow viewing angle mode is to be implemented, each length of the barriers 305 in upper and lower directions is designed to be short.

In the LCD device according to a third embodiment of the present disclosure, a narrow viewing angle mode and a wide viewing angle mode are selectively implemented, which will be explained in more detail with reference to FIGS. 7A and 7B.

In a narrow viewing angle mode, only the RGB sub-pixels 302 of the unit pixel lines having the barriers 305 at each interface among the RGB color filters 303 are driven, but the RGB sub-pixels 302 of other unit pixel lines are not driven.

That is, in a narrow viewing angle mode, only the RGB sub-pixels 302 of a group (G) are driven, the group (G) having two unit pixel lines in which the barriers 305 are formed at each interface among the RGB color filters 303. However, the RGB sub-pixels 302 of a group (F) having another two unit pixel lines are not driven.

As shown in FIGS. 7A and 7B, light incident to the RGB sub-pixels 302 of the unit pixel lines having the barriers 305 at each interface among the RGB color filters 303, with a relatively larger incidence angle is shielded by the barriers 305. However, light incident thereto with a relatively smaller incidence angle passes through inside of the transparent substrate 301 without being shielded by the barriers 305, and then is emitted outside the transparent substrate 301. Accordingly, an optical path is controlled by the barriers 305, and thus a screen of a narrow viewing angle can be implemented.

In the narrow viewing angle mode, only a half of the RGB sub-pixel lines of the color filter substrate 308 are driven, thereby having a higher aperture ratio than that of the first embodiment and the second embodiment.

When a wide viewing angle mode is to be implemented, all the RGB sub-pixel lines are driven.

As shown in FIGS. 7A and 7B, most of the light incident to the RGB sub-pixels 302 passes through inside of the transparent substrate 301, and then is emitted outside the transparent substrate 301. Accordingly, a screen of a wide viewing angle can be implemented.

Although not shown, the light incident to the RGB sub-pixels 302 is light emitted from a backlight assembly provided below the color filter substrate 308 and the TFT array substrate.

A method for fabricating an LCD device according to a third embodiment of the present disclosure is the same as the methods according to the first and second embodiments except for each position and longitudinal length of the barriers 305. Therefore, explanation for the method for fabricating an LCD device according to the third embodiment of the present disclosure will be omitted.

That is, the method for fabricating an LCD device according to the third embodiment of the present disclosure is different from the methods according to the first and second embodiments, in that the barriers 305 are formed at each interface between two unit pixel lines and two unit pixel lines, and the barriers 305 are further formed at each interface among the RGB sub-pixels in an alternate manner between the two unit pixel lines and the two unit pixel lines.

In the method for fabricating an LCD device according to the third embodiment of the present disclosure, the barriers 305 are formed at each interface among the RGB sub-pixels 302. Accordingly, even if each length of the barriers 305 in upper and lower directions is shorter than each length of the first and second embodiments, the same effect as those of the first and second embodiments can be obtained. As a result, the grooves formed on the transparent substrate 301 (refer to 105a of FIG. 5A) can have a minimized depth when the barriers 305 are formed.

In the LCD device, the barriers are formed in the substrate so as to come in contact with the black matrixes, thereby selectively implementing a narrow viewing angle mode and a wide viewing angle mode.

Furthermore, in the LCD device, each width of the barriers in right and left directions is the same as or similar to each width of the black matrixes in right and left directions. Accordingly, an aperture ratio is increased than that of the conventional LCD device for selectively implementing a narrow viewing angle mode and a wide viewing angle mode, thereby enhancing a brightness of a display screen.

Moreover, in the LCD device, the barriers are simply formed by forming the grooves on the transparent substrate of the color filter substrate and then by filling black resins in the grooves. Accordingly, the fabrication process of the LCD device is facilitated.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
   a substrate having a plurality of unit pixels, wherein each unit pixel includes a red sub-pixel, a green sub-pixel and a blue sub-pixel;
   a plurality of black matrix elements, each black matrix element being disposed at each interface between the red, green and blue sub-pixels;
   red, green, and blue color filters that are respectively disposed at the red, green and blue sub-pixels
   a plurality of barriers disposed in the substrate such that each barrier comes into contact with a corresponding black matrix element, the plurality of barriers including at least two barriers that are disposed on matrix elements at interfaces that are one unit pixels apart without any intervening barriers in-between, and the plurality of barriers including at least two barriers that are disposed on matrix elements at interfaces that are two unit pixels apart without having any intervening barriers in-between;
   wherein each barrier comes into contact with a corresponding black matrix element such that both the barrier and corresponding black matrix element overlap over at least two color filters.

2. The LCD device of claim 1, wherein in a narrow viewing angle mode, only unit pixels that are between two barriers spaced one unit pixel apart are driven, and wherein in a wide viewing angle mode all unit pixels are driven.

3. The LCD device of claim 1, wherein the RGB sub-pixels comprise one unit pixel, one line of the unit pixels comprises one unit pixel line, and the barriers are disposed at each interface between the unit pixel lines.

4. The LCD device of claim 3, wherein the barriers are disposed at each interface among one unit pixel line, one unit pixel line, and two unit pixel lines.

5. The LCD device of claim 4, wherein in a narrow viewing angle mode, only the unit pixel lines that have the barriers at both sides thereof are driven, whereas all the unit pixel lines are driven in a wide viewing angle mode.

6. The LCD device of claim 3, wherein the barriers are disposed at each interface between two unit pixel lines and two unit pixel lines, and are further disposed at each interface among the RGB sub-pixels in an alternate manner between the two unit pixel lines and the two unit pixel lines.

7. The LCD device of claim 6, wherein in a narrow viewing angle mode, only the unit pixel lines that have the barriers at each interface among the RGB color filters are driven, whereas all the unit pixel lines are driven in a wide viewing angle mode.

* * * * *